United States Patent
Yuan et al.

(10) Patent No.: US 11,621,981 B2
(45) Date of Patent: Apr. 4, 2023

(54) SYSTEMS AND METHODS FOR PROVIDING QUALITY GUARANTEED VOICE TRAFFIC IN CONJUNCTION WITH OVER-THE-TOP BEST EFFORT TRAFFIC

(71) Applicant: Verizon Patent and Licensing Inc., Basking Ridge, NJ (US)

(72) Inventors: Jun Yuan, Cranbury, NJ (US); Hesham Elbatouti, Pompton Lakes, NJ (US); Weimin Shi, Bridgewater, NJ (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 274 days.

(21) Appl. No.: 17/248,530

(22) Filed: Jan. 28, 2021

(65) Prior Publication Data
US 2022/0239704 A1 Jul. 28, 2022

(51) Int. Cl.
*H04L 65/1069* (2022.01)
*H04L 65/1016* (2022.01)
*H04M 7/00* (2006.01)

(52) U.S. Cl.
CPC ...... *H04L 65/1069* (2013.01); *H04L 65/1016* (2013.01); *H04M 7/0075* (2013.01)

(58) Field of Classification Search
CPC ............. H04L 65/1069; H04L 65/1016; H04L 65/401; H04M 7/0075
USPC ....................................................... 370/352
See application file for complete search history.

(56) References Cited

U.S. PATENT DOCUMENTS

| | | | |
|---|---|---|---|
| 2016/0381549 A1* | 12/2016 | Lam | H04W 4/14 455/414.1 |
| 2017/0264964 A1* | 9/2017 | Yoon | H04N 21/43615 |
| 2019/0319858 A1* | 10/2019 | Das | H04L 61/5007 |
| 2021/0219131 A1* | 7/2021 | Byadgi | H04L 65/1083 |

OTHER PUBLICATIONS

Fielding et al., Method Definitions (part of Hypertext Transfer Protocol—HTTP/1.1), Network Working Group, Request for Comments: 2616, The Internet Society, Jun. 1999, 5 pages. [Retrieved from https://www.w3.org/Protocols/rfc2616/rfc2616-sec9.html on Jan. 28, 2021].

(Continued)

*Primary Examiner* — Jirapon Tulop

(57) ABSTRACT

An originating user equipment may generate a request to utilize a service that links over-the-top content with a voice call, and may provide the request to an entitlement server of a core network associated with the originating user equipment. The originating user equipment may receive, from the entitlement server, information verifying entitlement of the originating user equipment for the service. The information may include a tag identifying the service. The originating user equipment may provide an invite message, with the tag, to a terminating user equipment and may establish the voice call with the terminating user equipment based on providing the invite message and via an Internet protocol multimedia subsystem (IMS) network and the core network. The originating user equipment may establish, concurrently with the voice call, a connection for the over-the-top content with the terminating user equipment via a data network and the core network.

20 Claims, 8 Drawing Sheets

(56) References Cited

OTHER PUBLICATIONS

"IMS Profile for Voice and SMS," GSM Association, Official Document IR.92—IMS Profile for Voice and SMS, Version 9.0, Apr. 8, 2015,40 pages. [Retrieved from https://www.gsma.com/newsroom/wp-content/uploads/IR.92-v9.0.pdf on Jan. 28, 2021].

* cited by examiner

SYSTEMS AND METHODS FOR PROVIDING QUALITY GUARANTEED VOICE TRAFFIC IN CONJUNCTION WITH OVER-THE-TOP BEST EFFORT TRAFFIC

BACKGROUND

An over-the-top (OTT) application is an application that delivers video content to a device (e.g., a smartphone, a tablet, a smart television, among other examples) using the Internet rather than using a cable television service or a satellite service. An OTT application allows a user to stream videos on a device of the user.

DETAILED DESCRIPTION OF PREFERRED EMBODIMENTS

Figure 1A:
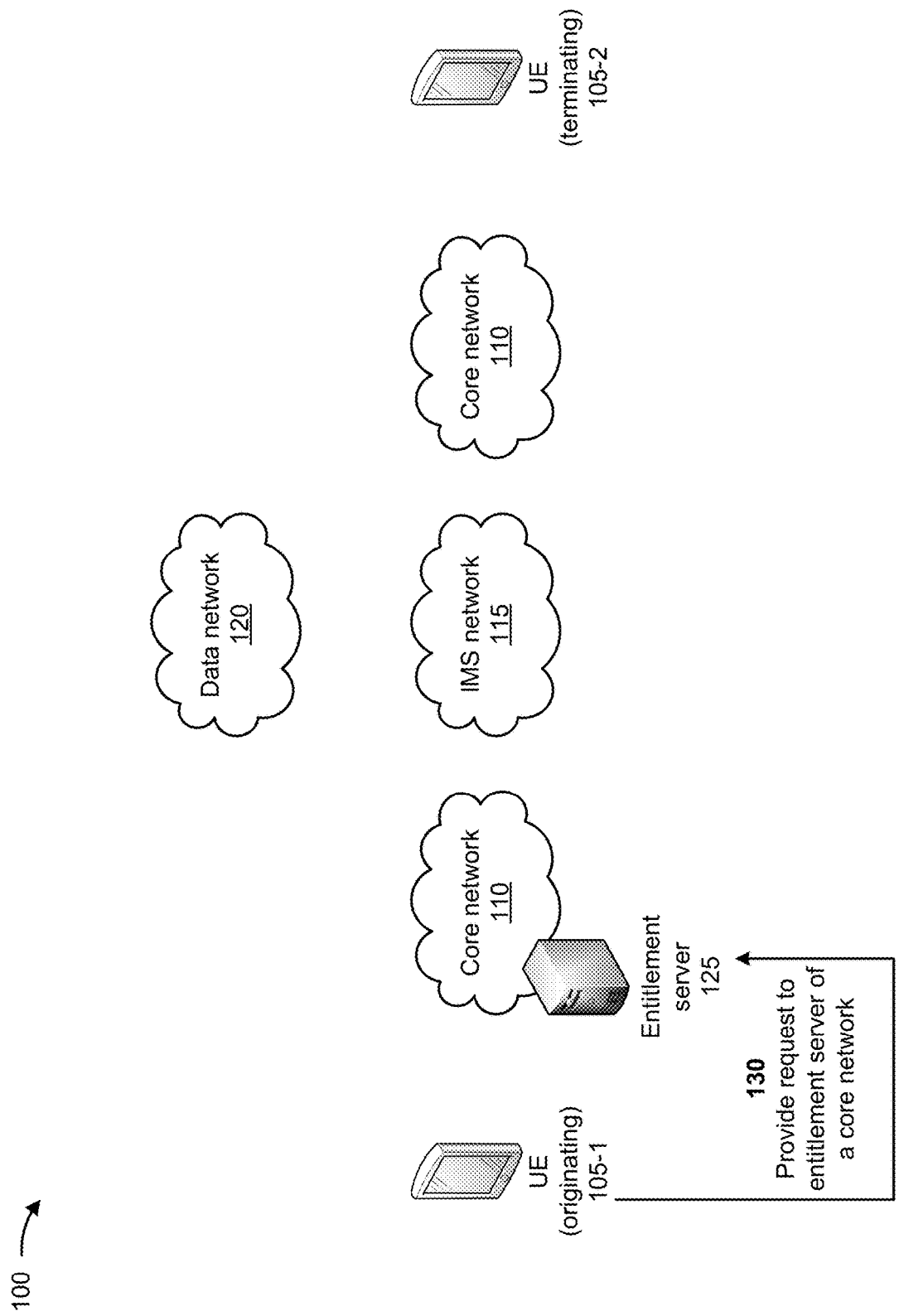
FIGS. 1A-1E are diagrams of an example associated with providing quality guaranteed voice traffic in conjunction with OTT best effort traffic.

The following detailed description of example implementations refers to the accompanying drawings. The same reference numbers in different drawings may identify the same or similar elements.

An over-the-top (OTT) application may support services that need good voice quality, such as a video call, a video conference call, video gaming (e.g., co-playing), virtual reality, augmented reality, co-viewing of video content, among other examples. In this regard, the OTT application may be associated with two different types of traffic including video traffic and voice traffic. The OTT application may cause the video traffic and the voice traffic to be routed, concurrently, from one device to another device.

Current techniques for routing traffic for OTT applications utilize best efforts for providing the video traffic and the voice traffic (e.g., the video traffic and the voice traffic are provided over a data network). Providing the video traffic and the voice traffic in such a manner subjects the video traffic and the voice traffic to delay and loss of packets. While delay and loss of packets may be tolerable with respect to the video traffic, delay and loss of packets may not be tolerable with respect to the voice traffic due to voice calls being associated with quality of service (QoS) requirements. The delay and loss of packets may cause the quality of voice calls to be degraded for OTT applications. Accordingly, under the current techniques for OTT applications, users may experience poor voice call quality during a video call, a video conference call, a video gaming session, a virtual reality session, an augmented reality session, or co-viewing of video content.

Thus, the current techniques for handling voice traffic and video traffic for OTT applications waste computing resources (e.g., processing resources, memory resources, and/or communication resources), networking resources, and/or other resources associated with detecting poor voice quality, configuring the OTT applications to attempt to improve the poor voice quality, configuring devices associated with the OTT applications to attempt to improve the poor voice quality, causing the OTT applications to retransmit voice traffic and/or video traffic, among other examples of remedial actions with respect to the poor voice quality.

Some implementations described herein include a user equipment (UE) that provides quality guaranteed voice traffic (e.g., guaranteed quality of service for voice traffic) in conjunction with OTT best effort traffic (e.g., best effort for OTT traffic). The OTT traffic may include video traffic, video gaming traffic, virtual reality traffic, augmented reality traffic, among other examples. In some examples, an originating UE may generate a request to utilize a service that links over-the-top traffic (of an over-the-top content) with voice traffic (of a voice call), and may provide the request to an entitlement server of a core network associated with the originating UE. The originating UE may receive, from the entitlement server, information verifying entitlement of the originating UE for the service. The information may include a tag identifying the service. The tag may include information identifying a network bridge (e.g., a voice bridge) or information identifying an application service (e.g., an OTT application service). The originating UE may generate, based on receiving the information verifying the entitlement, an invite message with the tag identifying the service and may provide the invite message to a terminating user equipment based on the terminating user equipment being verified for the service. The originating UE and the terminating UE may utilize the tag to access the network bridge or the application service in order to establish the voice call. The originating UE may establish the voice call with the terminating UE based on providing the invite message and via an IMS network and the core network. The originating UE may establish, concurrently with the voice call, a connection for the over-the-top content with the terminating UE via the core network and a data network.

By establishing the voice call with the terminating UE via the IMS network and the core network, the originating UE provides quality guaranteed voice traffic (e.g., guaranteed quality of service for voice traffic) in conjunction with OTT best effort traffic for an OTT application. The originating UE may separate voice traffic and OTT traffic (e.g., non-voice traffic) at different access point names (APNs) (e.g., which identify a data network such as a packet data network (PDN)), and may provide quality guaranteed voice traffic and OTT best effort traffic for the OTT application.

During initiation of the OTT application and before the quality guaranteed voice traffic is established, the originating UE may provide the tag (e.g., information identifying an OTT application service or a network bridge such as a voice bridge) to the terminating UE. The originating UE and the terminating UE may utilize the tag to establish a bearer service for providing (e.g., to the originating UE and to the terminating UE) the voice traffic in accordance with quality of service and establish a bearer service for providing (e.g., to the originating UE and to the terminating UE) the OTT traffic in accordance with best effort.

The originating UE and the terminating UE may utilize a mechanism to cause the voice traffic and the OTT traffic to be synchronized (for the originating UE and the terminating UE) and, thereby, to provide a quality voice user experience for users of the originating UE and the terminating UE. Thus, the originating UE conserves computing resources, networking resources, and/or other resources that would otherwise have been consumed by detecting poor voice quality, configuring OTT applications to attempt to improve the poor voice quality, configuring devices associated with the OTT applications to attempt to improve the poor voice quality, causing retransmission of voice traffic and/or OTT traffic, among other examples.

FIGS. 1A-1E are diagrams of an example 100 associated with providing quality guaranteed voice traffic in conjunction with OTT best effort traffic. As shown in FIGS. 1A-1E, example 100 includes a plurality of user equipment (UEs) 105, one or more core networks 110 (collectively "core networks 110" and individually "core network 110"), an Internet protocol (IP) multimedia subsystem (IMS) network 115, a data network 120, and an entitlement server 125. UE 105-1, UE 105-2, core network 110, IMS 115, data network 120, and entitlement server 125 are described in more detail below in connection with FIG. 2.

A UE 105 may include a wireless communication device, a mobile phone, a laptop computer, a tablet computer, a desktop computer, among other examples. As shown in FIG. 1A, the plurality of UEs 105 may include UE 105-1 (e.g., an originating UE) and UE 105-2 (e.g., a terminating UE). A core network 110 may include various types of telecommunications networks, such as a 4G network, a 5G network, a 5G next generation core network (NG Core), a long-term evolution (LTE) network, an LTE evolved packet core (EPC), among other examples. IMS network 115 may include a network that provides IMS services. Data network may include various types of data networks, such as the Internet, a third party services network, an operator services network, a private network, a wide area network, among other examples.

Entitlement server 125 may include one or more devices that determine whether UEs are authorized (or entitled) to utilize a service that separately routes OTT traffic and associated voice traffic. The OTT traffic may include video traffic, video gaming traffic, virtual reality traffic, augmented reality traffic, among other examples. In some implementations, the one or more devices may include a subscription data structure storing subscription data in association with subscriber information (e.g., information identifying different users and/or information identifying UEs 105 of the different users). The subscription data, for a particular user, may include voice call information indicating whether a UE 105 of the particular user is authorized to utilize the service that separately routes OTT traffic and associated voice traffic. In some examples, entitlement server 125 may be associated with a core network 110.

In some implementations, example 100 may include multiple entitlement server 125. For example, a first entitlement server 125 may be associated with a first core network 110 and may determine whether UE 105-1 is authorized to utilize the service that separately routes the OTT traffic and the voice traffic. A second entitlement server 125 may be associated with a second core network 110 and may determine whether UE 105-2 is authorized to utilize the service that separately routes the OTT traffic and the voice traffic.

In the example that follows, assume that a first user of UE 105-1 desires to establish a video call with a second user of UE 105-2. Further assume that UE 105-1 has initiated an application that enables UE 105-1 to establish the video call. Further assume that, based on input of the user using UE 105-1, the application has caused UE 105-1 to initiate the video call with UE 105-2. While the example is described with respect to a video call, the present disclosure is applicable to a video conference call, a video gaming session, a virtual reality session, an augmented reality session, or co-viewing of video content.

Further assume that the application is configured to cause a first connection for the voice traffic to be established between UE 105-1 and UE 105-2 via IMS network 115 (e.g., to cause the voice traffic (for the video call) to be provided via IMS network 115). IMS network 115 may provide a threshold quality of service for the voice call, as explained herein. Further assume that the application is configured to cause a second connection for OTT video traffic (for the video call) to be established via data network 120. Data network 120 may provide a best effort connection for the OTT video traffic, as explained herein.

As shown in FIG. 1A, and by reference number 130, UE 105-1 may provide a request to an entitlement server of a core network. For example, as part of causing the voice call to be established (e.g., as part of establishing the first connection for the voice traffic), the application may cause UE 105-1 to generate the request. The application may cause UE 105-1 to provide the request to entitlement server 125 to cause entitlement server 125 to verify whether UE 105-1 and UE 105-2 are authorized to utilize a service (that links OTT traffic with a voice call) to separately route the OTT traffic via data network 120 and the voice traffic via IMS network 115. The request may include information identifying the first user of UE 105-1, information identifying UE 105-1, information identifying the second user of UE 105-2, information identifying UE 105-2, information identifying entitlement server 125, information indicating that UE 105-1 and UE 105-2 desire to separately route the OTT traffic via data network 120 and the voice traffic via IMS network 115 (e.g., for the video call), among other examples. The information identifying the first user of UE 105-1 may include an identifier of the first user, a username of the first user, a password of the first user, a telephone number associated with the first user, among other examples. The information identifying UE 105-1 may include a network address (e.g., an IP address), a port identifier (e.g., a port name and/or a port number associated with UE 105-1), among other examples.

The information identifying the second user of UE 105-2 may include an identifier of the second user, a username of the second user, a password of the second user, a telephone number associated with the second user, among other examples. The information identifying UE 105-2 may include a network address (e.g., an IP address), a port identifier (e.g., a port name and/or a port number associated with UE 105-2), among other examples. The information identifying entitlement server 125 may include a network address (e.g., an IP address). The request may be provided to entitlement server 125 (e.g., to the network address of entitlement server 125) via a core network 110. In some implementations, the request may include a Hypertext Transfer Protocol Secure request.

In some implementations, the application may determine the service based on a type of OTT content (e.g., video call, video conference call, video gaming, among other examples), a type of network that UE 105-1 is connected to, a capability of UE 105-1, a configuration of UE 105-1, an availability of network services for the voice call, among other examples.

Figure 1B:
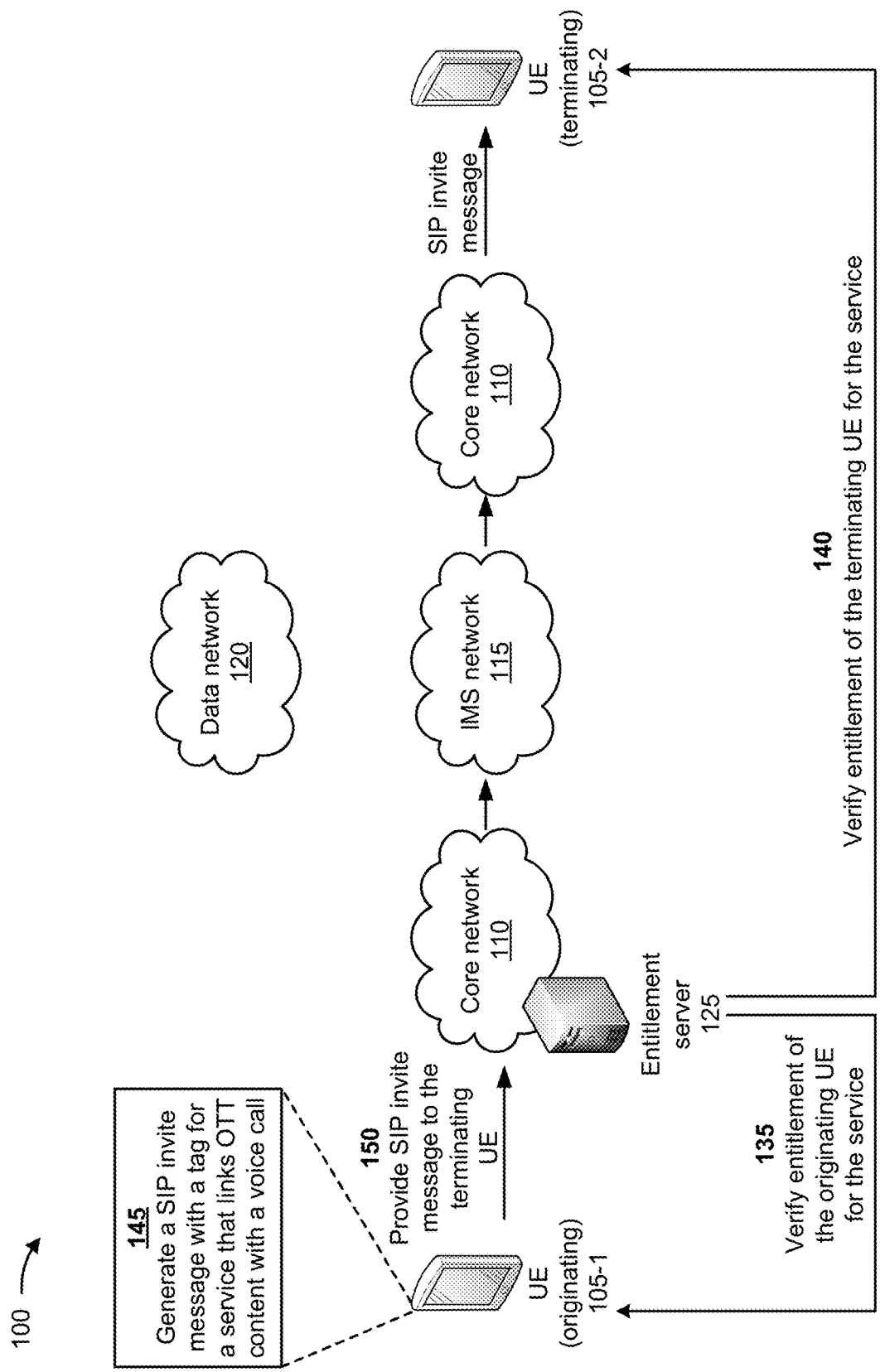

As shown in FIG. 1B, and by reference number 135, entitlement server 125 may verify entitlement of the originating UE for the service. For example, based on receiving the request, entitlement server 125 may determine whether UE 105-1 is authorized to utilize the service to separately route the OTT traffic via data network 120 and the voice traffic via IMS network 115. For instance, entitlement server 125 may determine whether the first user of UE 105-1 has subscribed to the service.

In some implementations, entitlement server 125 may perform a lookup of the subscription data structure using the information identifying the first user of UE 105-1 and/or the information identifying UE 105-1 included in the request. Based on performing the lookup, entitlement server 125 may identify subscription data associated with the information identifying the first user of UE 105-1 and/or the information identifying UE 105-1. In some examples, entitlement server 125 may use the subscription data to determine whether UE 105-1 is authorized to utilize the service (e.g., to separately route the OTT traffic via data network 120 and the voice traffic via IMS network 115). For example, entitlement server 125 may analyze the subscription data to determine whether the subscription data includes voice call information indicating that UE 105-1 is authorized to establish the voice call via IMS network 115 for routing the voice traffic of the video call. In some implementations, entitlement server 125 may determine the service based on the type of OTT content (e.g., video call, video conference call, video gaming, among other examples), the type of network that UE 105-1 is connected to, the capability of UE 105-1, the configuration of UE 105-1, the availability of network services for the voice call, among other examples. Information regarding the type of OTT content, the type of network, the configuration of UE 105-1, and/or the availability of network services may be included in the request and/or in the subscription data.

In some implementations, entitlement server 125 may authenticate the first user (e.g., to verify an identity of the first user). For example, entitlement server 125 may authenticate the first user based on the username and the password included in the information identifying the first user. For instance, entitlement server 125 may authenticate the first user by determining whether the username and the password, included in the information identifying the first user, match a username and a password stored by entitlement server 125 (e.g., included in the subscription data). Additionally, or alternatively, entitlement server 125 may authenticate the first user using a Session Initiation Protocol (SIP) based authentication technique (e.g., SIP Digest Authentication Scheme). Additionally, or alternatively, entitlement server 125 may authenticate the first user using a one-time personal identification number (PIN) code.

Additionally, or alternatively, entitlement server 125 may authenticate the first user using a Subscriber Identity Module (SIM) based authentication technique. For example, entitlement server 125 may authenticate the first user using an Extensible Authentication Protocol SIM (EAP-SIM) authentication technique. The above authentication techniques are merely provided as examples. Other authentication techniques or combinations of authentication techniques may be used in some situations.

As shown in FIG. 1B, and by reference number 140, entitlement server 125 may verify entitlement of the terminating UE for the service. For example, entitlement server 125 may determine whether UE 105-2 is authorized to access the service in a manner similar to the manner described above in connection with verifying the entitlement of UE 105-1.

Assume that, based on analyzing the subscription data associated with UE 105-1, entitlement server 125 determines that the subscription data includes the voice call information indicating that UE 105-1 is authorized to establish the voice call via IMS network 115 and, accordingly, verifies the entitlement of UE 105-1 for the service (e.g., verifies that UE 105-1 is authorized to access the service). Further assume that entitlement server 125 verifies the entitlement of UE 105-2 for the service in a similar manner. Entitlement server 125 may provide (e.g., to UE 105-1 and UE 105-2) information indicating that UE 105-1 and UE 105-2 are authorized to access the service. The information may include the tag for the service.

The tag may include information identifying the service. In some implementations, the service may include a network bridge (e.g., a voice bridge) for the voice call and the tag may include information identifying the network bridge. For example, the tag may include a link to the network bridge (e.g., a Uniform Resource Identifier (URI) associated with the network bridge, a Uniform Resource Locator (URL) associated with the network bridge, among other examples), a network address associated with the network bridge (e.g., an IP address associated with the network bridge), among other examples. As an example, UE 105-1, UE 105-2, and/or one or more other UEs 105 (e.g., that may receive the tag) may use the link to access the network bridge in order to establish the voice call.

In some implementations, the service may include an application service (e.g., an OTT application service) and the tag may include information identifying the application service. For example, the tag may include a link to the application service (e.g., a URI associated with the application service, a URL associated with the application service, among other examples), a network address associated with the application service (e.g., a network address of a device associated with the application service, such as an IP address of the device), among other examples. As an example, UE 105-1, UE 105-2, and/or one or more other UEs 105 (e.g., that may receive the tag) may use the link to access the application service in order to establish the voice call.

As shown in FIG. 1B, and by reference number 145, UE 105-1 may generate a session initiation protocol (SIP) invite message with the tag for the service that links OTT traffic with a voice call. For example, as part of causing the voice call to be established (e.g., as part of establishing the first connection for the voice traffic), the application may cause UE 105-1 to generate the SIP invite message.

In some implementations, the application may cause UE 105-1 to generate the SIP invite message based on the information provided by entitlement server 125 and indicating that UE 105-1 and UE 105-2 are authorized to access the service. The SIP invite message may include the information identifying the first user of UE 105-1, the information identifying UE 105-1, the information identifying the second user of UE 105-2, the information identifying UE 105-2, the tag, among other examples.

As shown in FIG. 1B, and by reference number 150, UE 105-1 may provide the SIP invite message to the terminating UE. For example, as part of causing the voice call to be established, the application may cause UE 105-1 to provide the SIP invite message to the UE 105-2. In some examples, the application may cause UE 105-1 to provide the SIP invite message to the UE 105-2 based on the information (e.g., provided by entitlement server 125) indicating that UE 105-1 and UE 105-2 are authorized to access the service. In some implementations, UE 105-1 may cause the SIP invite message to be provided via a serving gateway device, a packet data network gateway associated with IMS network 115, and IMS network 115. UE 105-1 may provide the SIP invite message before, after, or concurrently with providing the SIP invite message to entitlement server 125. UE 105-2 may receive the SIP invite message and analyze the SIP invite message to identify the tag. Based on identifying the tag, UE 105-2 may determine that the voice call is to be established via IMS network 115.

Figure 1C:
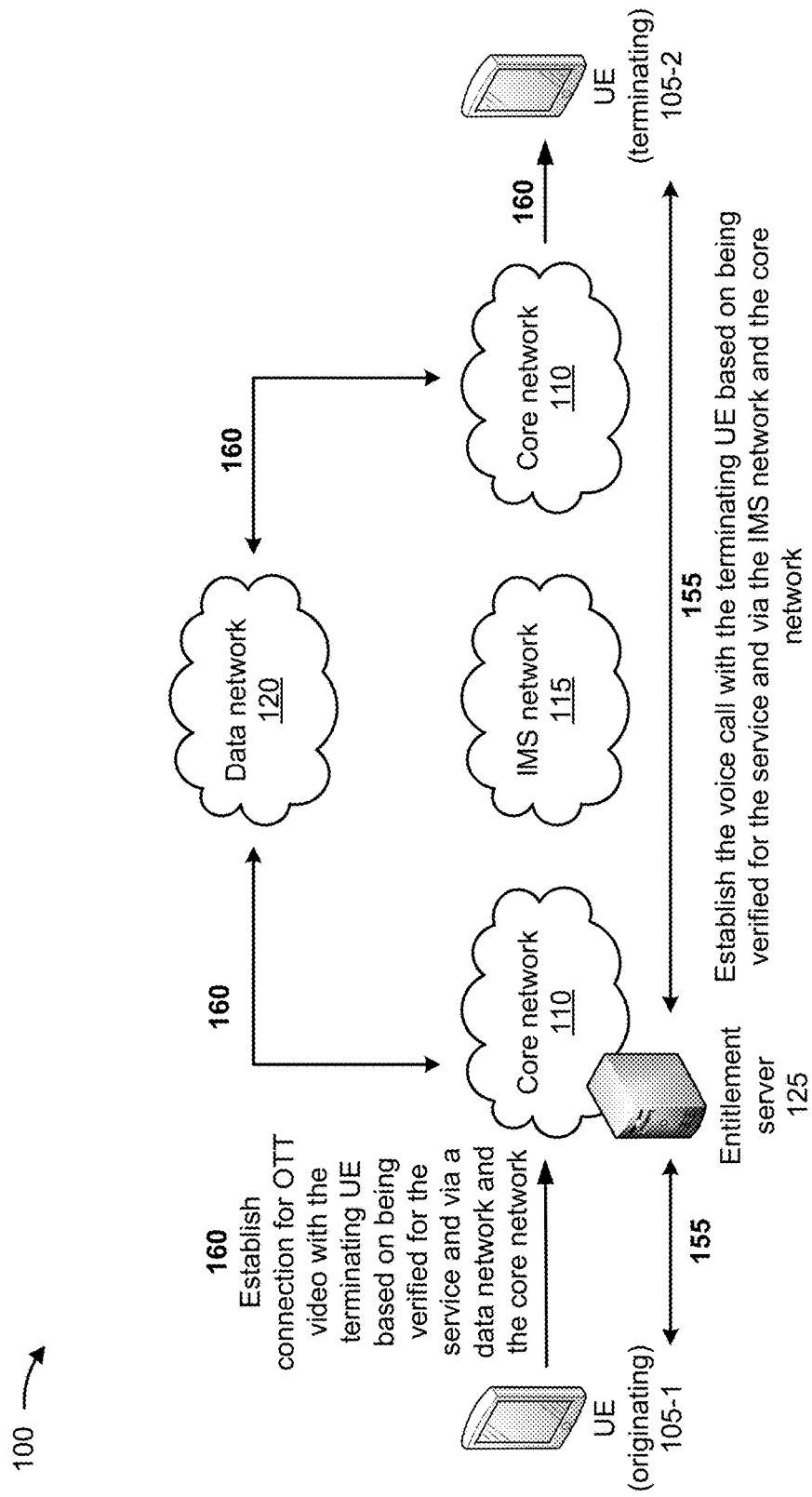

As shown in FIG. 1C, and by reference number 155, UE 105-1 may establish a voice call with the terminating UE 105-1 based on being verified for the service and via the IMS network and the core network. For example, assume that, based on analyzing the subscription data associated with UE 105-1, entitlement server 125 determines that UE 105-1 and UE 105-2 are authorized to establish the voice call via IMS network 115, as explained above.

In some implementations, entitlement server 125 may provide, to UE 105-1 and/or UE 105-2, the information indicating that UE 105-1 and UE 105-2 are authorized to access the service. Based on receiving the information indicating that UE 105-1 and UE 105-2 are authorized to access the service, UE 105-2 may provide (e.g., to UE 105-1) a SIP message responsive to the SIP invite message. The SIP message may include a SIP 200 OK message. For example, assume the second user accepts and desires to access the service to cause the voice call to be established. The SIP message may include information indicating an acceptance of UE 105-2 to access the service to cause the voice call to be established with UE 105-1 via IMS network 115.

UE 105-1 may receive the SIP message and, based on receiving the SIP message, may cause the voice call to be established between UE 105-1 and UE 105-2. As shown in FIG. 1C, the voice call may be established via a first core network 110 with which UE 105-1 is associated, IMS network 115, and a second core network 110 with which UE 105-2 is associated. UE 105-1 may establish the voice call via IMS network 115 to satisfy the threshold quality of service for the voice traffic of the video call, as explained herein.

In some implementations, the application may be configured to cause UE 105-1 to establish the voice call with UE 105-2 via a real-time transport protocol (RTP). In this regard, RTP packets (e.g., including data regarding the voice call) may be provided between UE 105-1 and UE 105-2 (e.g., via a serving gateway device, a packet data network gateway associated with IMS network 115, and IMS network 115). In some implementations, as part of causing the voice call to be established, UE 105-1 may cause resources to be allocated for the voice call (e.g., cause transcoding resources to be allocated for the voice call, cause a bearer service to be allocated for the voice call, among other examples).

As shown in FIG. 1C, and by reference number 160, UE 105-1 may establish a connection for the OTT video with the terminating UE based on being verified for the service and via a data network and the core network. For example, the application may cause UE 105-1 to establish the connection for the OTT video traffic with UE 105-2. In some implementations, the application may cause the connection for the OTT video traffic to be established via data network 120 (e.g., a packet data network). In some examples, the video traffic may be provided, via data network 120, as data packets. Data network 120 may provide a best effort connection (e.g., a best effort bearer connection for the OTT traffic).

The second connection for the OTT video traffic may be established concurrently with the first connection for the voice call to cause the video traffic for the video call to be provided concurrently with the voice traffic for the video call. By causing the video traffic to be provided (in accordance with best effort) concurrently with the voice traffic being established in accordance with the threshold quality of service, UE 105-1 conserves computing resources, networking resources, and/or other resources associated with detecting poor voice quality, configuring the application to attempt to improve the poor voice quality, configuring UE 105-1 and/or UE 105-2 to attempt to improve the poor voice quality, causing retransmission of voice traffic and/or OTT traffic as a result of the poor voice quality, among other examples.

In some implementations, UE 105-1 may cause the video traffic to be provided via a serving gateway device, a packet data network gateway associated with data network 120, and data network 120. In some examples, a video server (e.g., associated with data network 120) may cause the video content to be provided between UE 105-1 and UE 105-2. In some implementations, as part of causing the connection to be established, UE 105-1 may cause resources to be allocated for the OTT video (e.g., cause transcoding resources to be allocated for the OTT video, cause a bearer service to be allocated for the OTT video, among other examples).

Figure 1D:
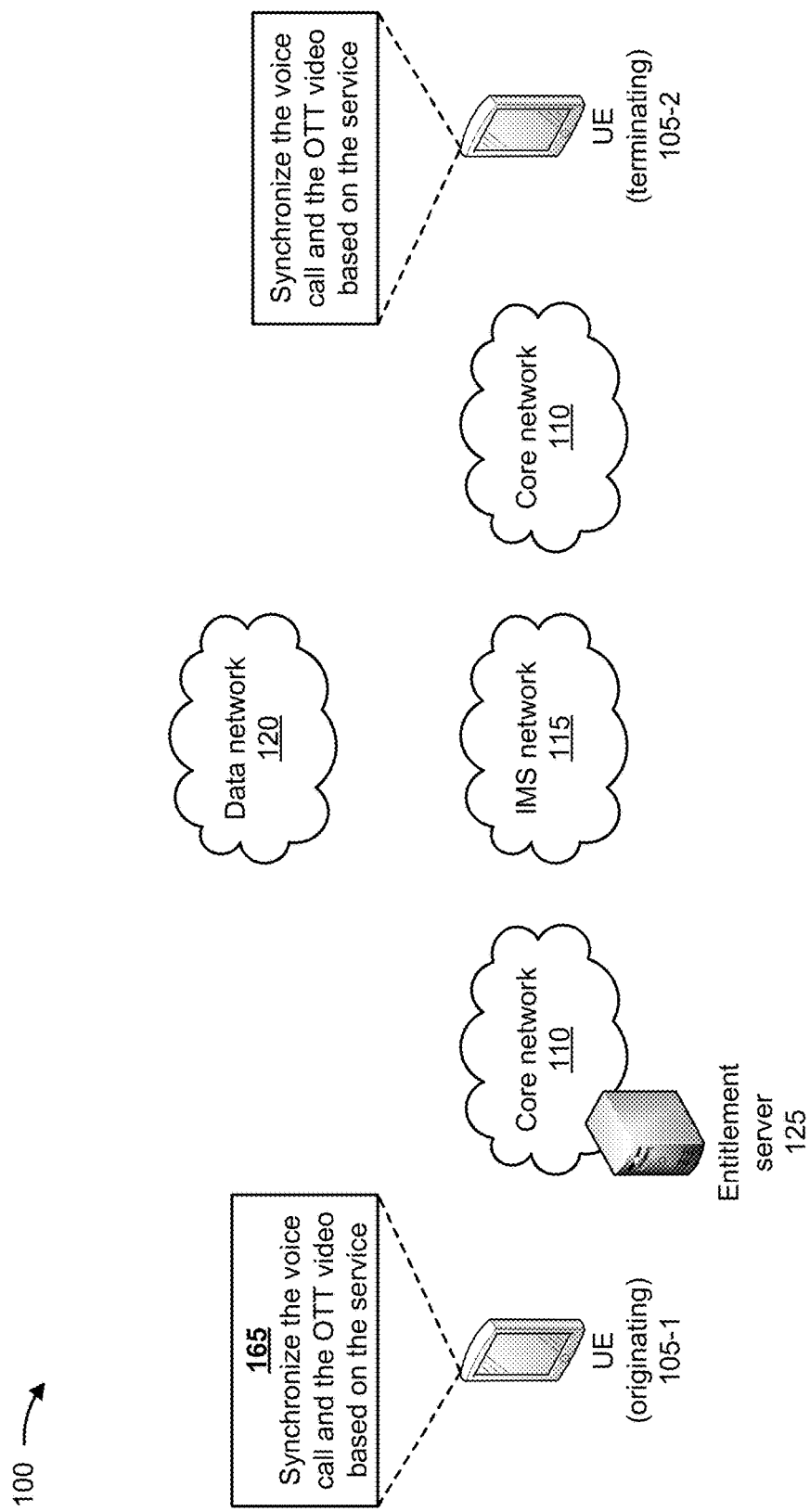

As shown in FIG. 1D, and by reference number 165, UE 105-1 may synchronize the voice call and the OTT video based on the service. For example, UE 105-1 may synchronize the voice call and the OTT video using timestamps and sequence numbers of packets associated with the voice call and packets associated with the OTT video. Assume, that UE 105-2 has transmitted traffic (e.g., packets) for the video call. In some implementations, each packet may include a timestamp and a sequence number. The timestamp may represent a date and time at which the packet was generated. The sequence number may represent information indicating an order in which the packets are to be transmitted. Assume that, based on the service, the traffic has been separated into the voice traffic (e.g., first packets) and the video traffic (e.g., second packets). Further assume that the voice traffic (e.g., the first packets) and the video traffic (e.g., the second packets) have been routed to UE 105-1. UE 105-1 may receive the first packets and obtain first timestamps and first sequence numbers from the first packets associated with the voice call. In some examples, the first packets may be RTP packets. The first packets may be provided by UE 105-2. UE 105-1 may receive the second packets and obtain second timestamps and second sequence numbers from the second packets. In some examples, the second packets may be RTP packets and may be provided by UE 105-2.

The application may cause UE 105-1 to synchronize the voice call and the OTT video based on the first timestamps, the second timestamps, the first sequence numbers, and the second sequence numbers. For example, UE 105-1 may analyze the first timestamps, the second timestamps, the first sequence numbers, and the second sequence numbers. In some examples, based on the analysis, UE 105-1 may cause the first packets and the second packets to be provided (e.g., to the first user) based on an audio-to-video synchronization technique. For example, UE 105-1 may cause the first packets and the second packets to be provided in a chronological order based on the first timestamps and the second timestamps. For instance, UE 105-1 may cause a packet (of the first packets) and a packet (of the second packets) that are associated with a same timestamp to be provided concurrently, followed by a subsequent packet (of the first packets) and a subsequent packet (of the second packets) that are associated with a same subsequent timestamp to be provided concurrently, and so on.

Additionally, or alternatively, to causing the first packets and the second packets to be provided based on the audio-to-video synchronization technique, UE 105-1 (e.g., using the application) may cause the first packets and the second packets to be ordered based on the first sequence numbers and the second sequence numbers. In some implementations, UE 105-1 may receive, from UE 105-2, status information identifying an arrival status of packets (associated with the voice traffic and the video traffic) generated and provided by UE 105-1.

The status information may include information identifying timestamps and sequence numbers of the packets generated and provided by UE 105-1. Based on the status information, UE 105-1 may generate new packets associated with the voice traffic and the video traffic and modify timestamps and sequence numbers for the new packets. For example, the timestamps (for the new packets) may be modified to be chronologically subsequent with respect to the timestamps identified in the status information. Additionally, or alternatively, the sequence numbers (for the new packets) may be modified to be subsequent to the sequence numbers identified in the status information. UE 105-1 may provide the new packets to UE 105-1. By modifying the timestamps and/or the sequence numbers (for the new packets) in such a manner, UE 105-1 may cause the video traffic and the voice traffic (received by UE 105-2) to remain synchronized. In some implementations, UE 105-1 may use the status information to adjust coding resolution associated with the OTT video and/or resend packets (e.g., due to packet loss).

As shown, UE 105-2 may synchronize the voice call and the OTT video based on the service. In some examples, UE 105-2 may synchronize the voice call and the OTT video in a manner similar to the manner described above. In some implementations, UE 105-1 and UE 105-2 may use a jitter buffer to reduce packet loss and, thereby, improve a quality of the voice call. Using the jitter buffer may conserve computing resources, networking resources, and/or other resources that would otherwise have been consumed by detecting poor voice quality, configuring the application to attempt to improve the poor voice quality, configuring UE 105-1 and/or UE 105-2 to attempt to improve the poor voice quality, causing retransmission of the voice traffic and/or the video traffic, among other examples.

While the foregoing example has been described with respect to separately routing the OTT traffic via data network 120 and the voice traffic via IMS network 115, in some implementations, the OTT traffic may be routed via a cellular network (e.g., a fifth generation (5G) network) and the voice traffic via IMS network 115. Additionally, the foregoing example may be applicable to synchronizing multiple media streams with a single bearer device that enables the tag to be provided for the multiple media streams. In some implementations, a third user may be added to the video call between the first user of UE 105-1 and the second of UE 105-2. For example, assume that the first user desires to add the third user to the video call. In this regard, UE 105-1 may generate another SIP invite message with the tag and provide the SIP invite message to entitlement server 125 and to a UE 105 of the third user, in a manner similar to the manner described above. Assume that entitlement server 125 verifies the UE 105 of the third user for the service. UE 105-1 may establish (e.g., based on the UE 105 being verified for the service) another voice call with the UE 105 of the third user via IMS network 115 and core network 110, in a manner similar to the manner described above. UE 105-1 may establish, concurrently with the other voice call and via the core network, another connection for the OTT video with the UE 105 of the third user.

Figure 1E:
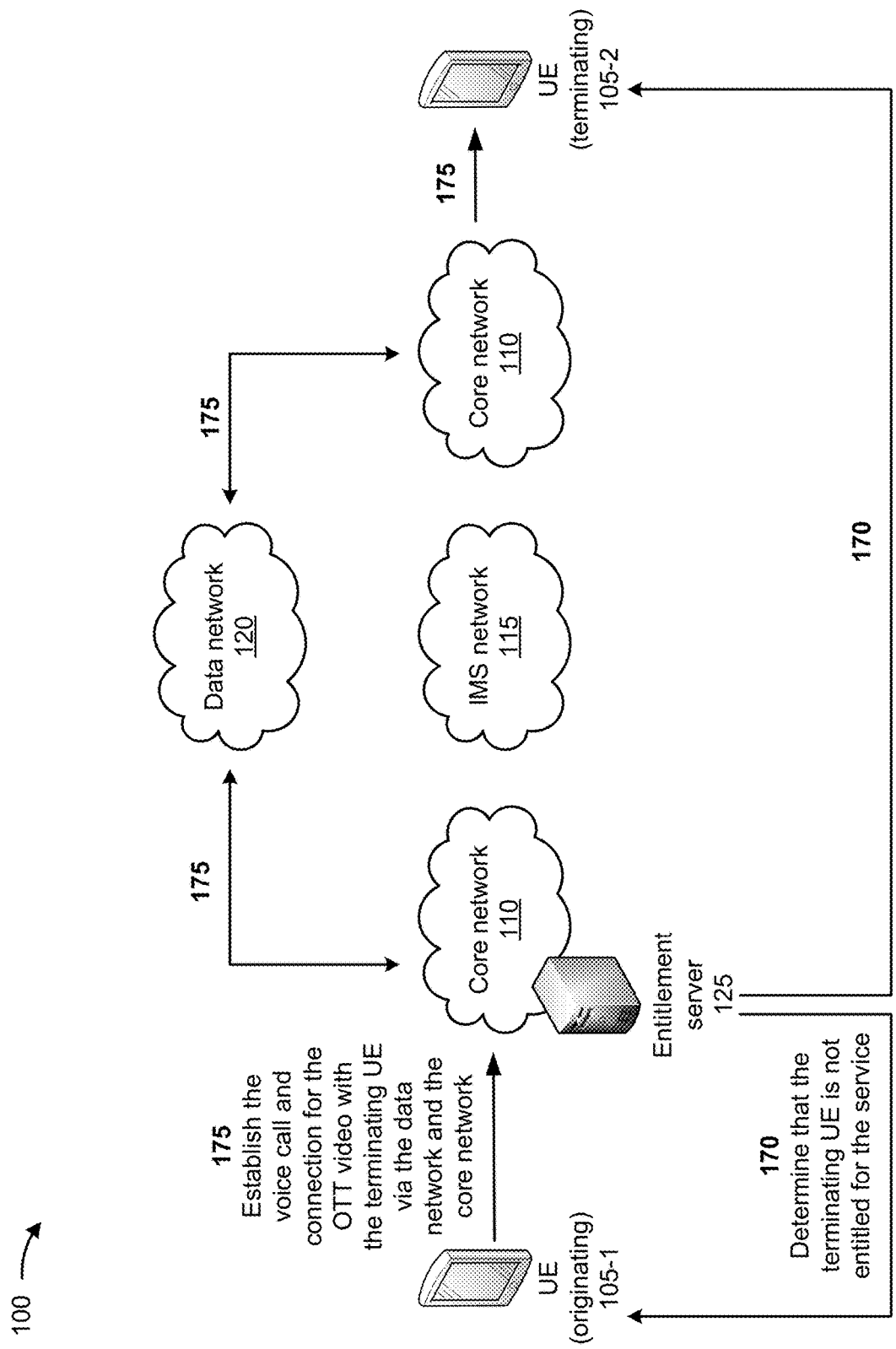

As shown in FIG. 1E, and by reference number 170, UE 105-1 may determine that the terminating UE is not entitled for the service. For example, as opposed to what was described in connection with reference number 145 (FIG. 1B above), assume that entitlement server 125 determines that UE 105-2 is not authorized to access the service (e.g., because the subscription data does not include the voice call information). Entitlement server 125 may provide, to UE 105-1 and/or to UE 105-2, information indicating that UE 105-2 is not authorized to access the service. Based on receiving the information, UE 105-1 (e.g., using the application) may determine that UE 105-2 is not entitled for the service (e.g., determine that UE 105-2 is not authorized to access the service).

As shown in FIG. 1E, and by reference number 175, UE 105-1 may establish the voice call and the connection for the OTT video with the terminating UE via the data network and the core network. For example, based on determining that UE 105-2 is not entitled for the service, the application may cause UE 105-1 to establish the voice call and the connection for the OTT video with UE 105-2 via core network 110 and data network 120. The connection for the OTT video may be established in a manner similar to the manner described above in connection with FIG. 1C. The voice call may be established via core network 110 and data network 120 in a similar manner.

By causing the voice call to be established via IMS network 115 concurrently with the connection for the OTT video being established via data network 120, UE 105-1 may satisfy the threshold quality of service for the voice call and may, thereby, conserve computing resources, networking resources, and/or other resources that would have otherwise been consumed by detecting poor voice quality, configuring OTT applications to attempt to improve the poor voice quality, configuring devices associated with OTT applications to attempt to improve the poor voice quality, causing retransmission of the voice traffic and/or the OTT traffic, among other examples.

While the foregoing examples have been described with respect to establishing a video call and streaming video content, the present disclosure is also, or alternatively, applicable to establishing a video conference call, video gaming (individual playing and/or co-playing), virtual reality, augmented reality, co-viewing of video content, among other examples. In this regard, the service may separately route OTT traffic (e.g., video gaming traffic, virtual reality traffic, augmented reality traffic, among other examples) via data network 120 and the voice traffic via IMS network 115. Furthermore, while the foregoing examples have been described with respect to separating voice traffic and OTT traffic on an APN level, the present disclosure may be applicable to separating voice traffic and OTT traffic on a cloud slice level.

As indicated above, FIGS. 1A-1E are provided as an example. Other examples may differ from what is described with regard to FIGS. 1A-1E. The number and arrangement of devices shown in FIGS. 1A-1E are provided as an example. In practice, there may be additional devices, fewer devices, different devices, or differently arranged devices than those shown in FIGS. 1A-1E. Furthermore, two or more devices shown in FIGS. 1A-1E may be implemented within a single device, or a single device shown in FIGS. 1A-1E may be implemented as multiple, distributed devices. Additionally, or alternatively, a set of devices (e.g., one or more devices) shown in FIGS. 1A-1E may perform one or more functions described as being performed by another set of devices shown in FIGS. 1A-1E.

Figure 2:
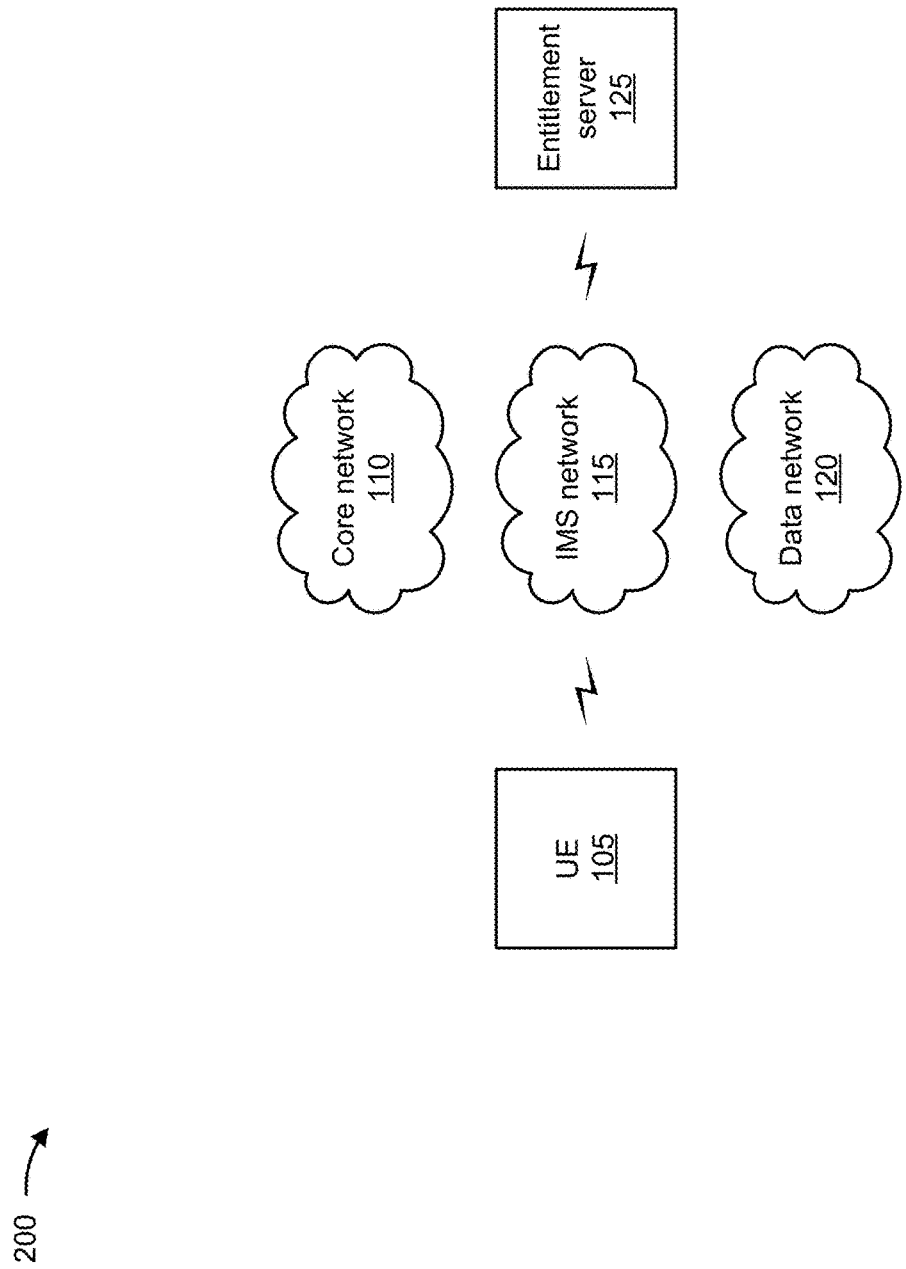
FIG. 2 is a diagram of an example environment in which systems and/or methods described herein may be implemented.

FIG. 2 is a diagram of an example environment 200 in which systems and/or methods described herein may be implemented. As shown in FIG. 2, environment 200 may include UE 105, core network 110, IMS network 115, data network 120, and entitlement server 125. Devices and/or elements of environment 200 may interconnect via wired connections and/or wireless connections.

UE 105 includes one or more devices capable of receiving, generating, storing, processing, and/or providing information, as described elsewhere herein. UE 105 may include a communication device. For example, UE 105 may include a wireless communication device, a mobile phone, a user equipment, a laptop computer, a tablet computer, a desktop computer, a gaming console, a set-top box, a wearable communication device (e.g., a smart wristwatch, a pair of smart eyeglasses, a head mounted display, or a virtual reality headset), or a similar type of device.

Core network 110 includes one or more wired and/or wireless networks. For example, core network 110 may include a cellular network (e.g., a fifth generation (5G) network, evolved packet system (EPS), a fourth generation (4G) network, a long-term evolution (LTE) network, a third generation (3G) network, a code division multiple access (CDMA) network, etc.), a public land mobile network (PLMN), a local area network (LAN), a wide area network (WAN), a metropolitan area network (MAN), a telephone network (e.g., the Public Switched Telephone Network (PSTN)), a private network, an ad hoc network, an intranet, the Internet, a fiber optic-based network, and/or a combination of these or other types of networks. Core network 110 enables communication among the devices of example 100.

IMS network 115 includes one or more wired and/or wireless networks. For example, IMS network 115 may include an architectural framework or network (e.g., a telecommunications network) for delivering IP multimedia services.

Data network 120 includes one or more wired and/or wireless networks. For example, data network 120 may include a LAN, a WAN, a MAN, a telephone network (e.g., the PSTN), a private network, an ad hoc network, an intranet, the Internet, a fiber optic-based network, among other examples, and/or a combination of these or other types of networks.

Entitlement server 125 includes one or more devices capable of receiving, generating, storing, processing, providing, and/or routing information, as described elsewhere herein. Entitlement server 125 may include a communication device and/or a computing device. For example, entitlement server 125 may include a server, such as an application server, a client server, a web server, a database server, a host server, a proxy server, a virtual server (e.g., executing on computing hardware), or a server in a cloud computing system. In some implementations, entitlement server 125 includes computing hardware used in a cloud computing environment.

The number and arrangement of devices and networks shown in FIG. 2 are provided as an example. In practice, there may be additional devices and/or networks, fewer devices and/or networks, different devices and/or networks, or differently arranged devices and/or networks than those shown in FIG. 2. Furthermore, two or more devices shown in FIG. 2 may be implemented within a single device, or a single device shown in FIG. 2 may be implemented as multiple, distributed devices. Additionally, or alternatively, a set of devices (e.g., one or more devices) of environment 200 may perform one or more functions described as being performed by another set of devices of environment 200.

Figure 3:
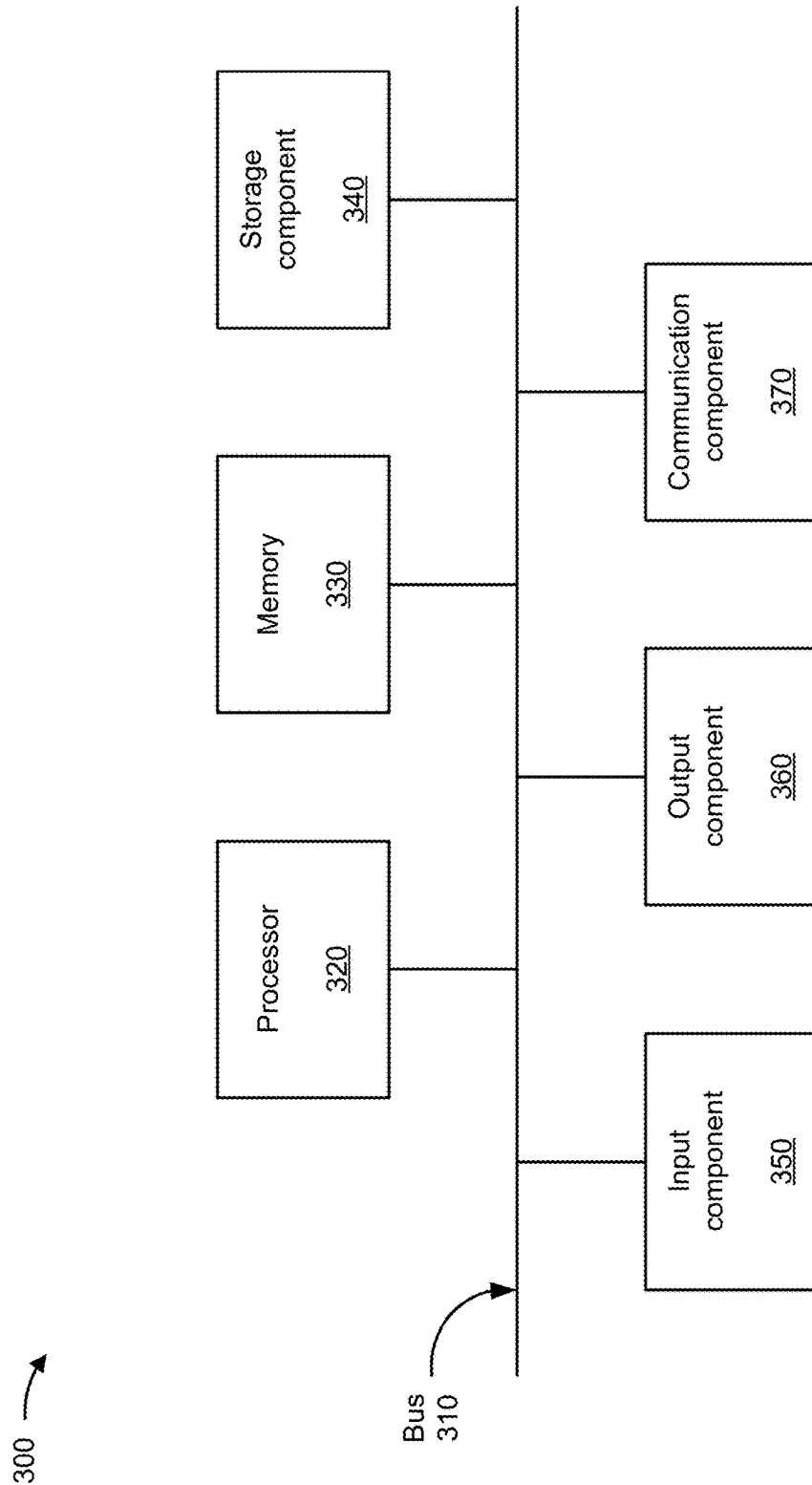
FIG. 3 is a diagram of example components of one or more devices of FIG. 2.

FIG. 3 is a diagram of example components of one or more devices of FIG. 2. The one or more devices may correspond to a device 300, which may correspond to UE 105 and/or entitlement server 125. In some implementations, UE 105 and/or entitlement server 125 may include one or more devices 300 and/or one or more components of device 300. As shown in FIG. 3, device 300 may include a bus 310, a processor 320, a memory 330, a storage component 340, an input component 350, an output component 360, and a communication component 370.

Bus 310 includes a component that enables wired and/or wireless communication among the components of device 300. Processor 320 includes a central processing unit, a graphics processing unit, a microprocessor, a controller, a microcontroller, a digital signal processor, a field-programmable gate array, an application-specific integrated circuit, and/or another type of processing component. Processor 320 is implemented in hardware, firmware, or a combination of hardware and software. In some implementations, processor 320 includes one or more processors capable of being programmed to perform a function. Memory 330 includes a random access memory, a read only memory, and/or another type of memory (e.g., a flash memory, a magnetic memory, and/or an optical memory).

Storage component 340 stores information and/or software related to the operation of device 300. For example, storage component 340 may include a hard disk drive, a magnetic disk drive, an optical disk drive, a solid-state disk drive, a compact disc, a digital versatile disc, and/or another type of non-transitory computer-readable medium. Input component 350 enables device 300 to receive input, such as user input and/or sensed inputs. For example, input component 350 may include a touch screen, a keyboard, a keypad, a mouse, a button, a microphone, a switch, a sensor, a global positioning system component, an accelerometer, a gyroscope, and/or an actuator. Output component 360 enables device 300 to provide output, such as via a display, a speaker, and/or one or more light-emitting diodes. Communication component 370 enables device 300 to communicate with other devices, such as via a wired connection and/or a wireless connection. For example, communication component 370 may include a receiver, a transmitter, a transceiver, a modem, a network interface card, and/or an antenna.

Device 300 may perform one or more processes described herein. For example, a non-transitory computer-readable medium (e.g., memory 330 and/or storage component 340) may store a set of instructions (e.g., one or more instructions, code, software code, and/or program code) for execution by processor 320. Processor 320 may execute the set of instructions to perform one or more processes described herein. In some implementations, execution of the set of instructions, by one or more processors 320, causes the one or more processors 320 and/or the device 300 to perform one or more processes described herein. In some implementations, hardwired circuitry may be used instead of or in combination with the instructions to perform one or more processes described herein. Thus, implementations described herein are not limited to any specific combination of hardware circuitry and software.

The number and arrangement of components shown in FIG. 3 are provided as an example. Device 300 may include additional components, fewer components, different components, or differently arranged components than those shown in FIG. 3. Additionally, or alternatively, a set of components (e.g., one or more components) of device 300 may perform one or more functions described as being performed by another set of components of device 300.

Figure 4:
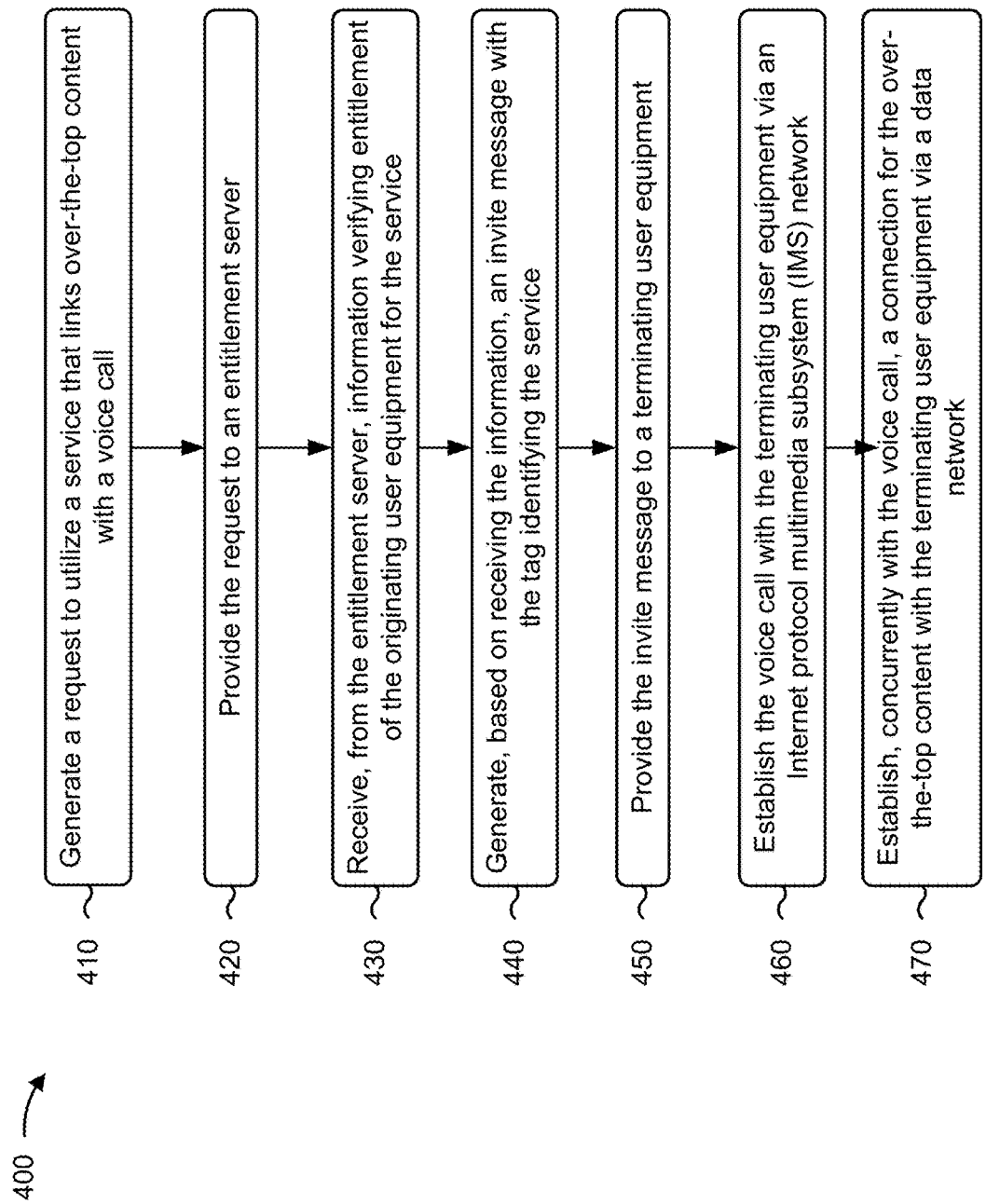
FIG. 4 is a flowchart of an example process relating to providing quality guaranteed voice traffic in conjunction with OTT best effort traffic.

FIG. 4 is a flowchart of an example process 400 relating to providing quality guaranteed voice traffic in conjunction with OTT best effort OTT traffic. In some implementations, one or more process blocks of FIG. 4 may be performed by an originating user equipment (e.g., UE 105-1). In some implementations, one or more process blocks of FIG. 4 may be performed by another device or a group of devices separate from or including the originating user equipment, such as a terminating user equipment (e.g., UE 105-2) and/or an entitlement server (e.g., entitlement server 125). Additionally, or alternatively, one or more process blocks of FIG. 4 may be performed by one or more components of device 300, such as processor 320, memory 330, storage component 340, input component 350, output component 360, and/or communication component 370.

As shown in FIG. 4, process 400 may include generating a request to utilize a service that links over-the-top video with a voice call (block 410). For example, the originating user equipment may generate a request to utilize a service that links over-the-top video with a voice call, as described above.

In some implementations, the service is an over-the-top application service and the tag includes a link to the over-the-top application service. In some implementations, the service is a voice bridge for the voice call and the tag includes a link to the voice bridge.

As further shown in FIG. 4, process 400 may include providing the request to an entitlement server of a core network associated with the originating user equipment (block 420). For example, the originating user equipment may provide the request to an entitlement server of a core network associated with the originating user equipment, as described above.

As further shown in FIG. 4, process 400 may include receiving, from the entitlement server, information verifying entitlement of the originating user equipment for the service (block 430). For example, the originating user equipment may receive, from the entitlement server, information verifying entitlement of the originating user equipment for the service, the information including a tag identifying the service, as described above.

As further shown in FIG. 4, process 400 may include generating, based on receiving the information verifying the entitlement, an invite message with the tag identifying the service (block 440). For example, the originating user equipment may generate, based on receiving the information verifying the entitlement, an invite message with the tag identifying the service, as described above.

As further shown in FIG. 4, process 400 may include providing the invite message to a terminating user equipment based on the terminating user equipment being verified for the service (block 450). For example, the originating user equipment may provide the invite message to a terminating user equipment based on the terminating user equipment being verified for the service, as described above.

As further shown in FIG. 4, process 400 may include establishing the voice call with the terminating user equipment based on providing the invite message and via an Internet protocol multimedia subsystem (IMS) network and the core network (block 460). For example, the originating user equipment may establish the voice call with the terminating user equipment based on providing the invite message and via an Internet protocol multimedia subsystem (IMS) network and the core network, as described above.

In some implementations, establishing the voice call with the terminating user equipment includes establishing the voice call with the terminating user equipment via a real-time transport protocol. The IMS network may provide a threshold quality of service for the voice call established between the originating user equipment and the terminating user equipment.

In some implementations, process 400 includes generating another invite message with the tag; establishing, based on another terminating user equipment being verified for the service, another voice call with the other terminating user equipment via the IMS network and the core network; and establishing, concurrently with the other voice call and via the core network, another over-the-top video with the other terminating user equipment.

In some implementations, process 400 includes establishing, based on the other terminating user equipment not being verified for the service, the other voice call with the other terminating user equipment via the data network and the core network.

As further shown in FIG. 4, process 400 may include establishing concurrently with the voice call, and via the core network, a connection for the over-the-top video with the terminating user equipment or a data network (block 470). For example, the originating user equipment may establish concurrently with the voice call, and via the core network, the over-the-top video with the terminating user equipment or a data network, as described above.

The data network may provide a best effort bearer connection for the over-the-top video. In some implementations, process 400 includes synchronizing the voice call and the over-the-top video based on the service.

In some implementations, process 400 includes establishing, based on the terminating user equipment not being verified for the service, the voice call with the terminating user equipment via the data network and the core network.

In some implementations, process 400 includes receiving first timestamps and first sequence numbers from first packets associated with the voice call; receiving second timestamps and second sequence numbers from second packets associated with the over-the-top video, and synchronizing the voice call and the over-the-top video based on the first timestamps, the second timestamps, the first sequence numbers, and the second sequence numbers.

In some implementations, process 400 includes receiving, from the terminating user equipment, status information identifying an arrival status of packets associated with the voice call and the over-the-top video and generated by the originating user equipment; modifying timestamps and sequence numbers for new packets associated with the voice call and the over-the-top video based on the status information; and providing the new packets to the terminating user equipment.

Although FIG. 4 shows example blocks of process 400, in some implementations, process 400 may include additional blocks, fewer blocks, different blocks, or differently arranged blocks than those depicted in FIG. 4. Additionally, or alternatively, two or more of the blocks of process 400 may be performed in parallel.

The foregoing disclosure provides illustration and description, but is not intended to be exhaustive or to limit the implementations to the precise form disclosed. Modifications and variations are possible in light of the above disclosure or can be acquired from practice of the implementations.

As used herein, the term "component" is intended to be broadly construed as hardware, firmware, or a combination of hardware and software. It will be apparent that systems and/or methods described herein may be implemented in different forms of hardware, firmware, and/or a combination of hardware and software. The actual specialized control hardware or software code used to implement these systems and/or methods is not limiting of the implementations. Thus, the operation and behavior of the systems and/or methods are described herein without reference to specific software code—it being understood that software and hardware can be used to implement the systems and/or methods based on the description herein.

As used herein, satisfying a threshold may, depending on the context, refer to a value being greater than the threshold, greater than or equal to the threshold, less than the threshold, less than or equal to the threshold, equal to the threshold, not equal to the threshold, or the like.

To the extent the aforementioned implementations collect, store, or employ personal information of individuals, it should be understood that such information shall be used in accordance with all applicable laws concerning protection of personal information. Additionally, the collection, storage, and use of such information can be subject to consent of the individual to such activity, for example, through well known "opt-in" or "opt-out" processes as can be appropriate for the situation and type of information. Storage and use of personal information can be in an appropriately secure manner reflective of the type of information, for example, through various encryption and anonymization techniques for particularly sensitive information.

Even though particular combinations of features are recited in the claims and/or disclosed in the specification, these combinations are not intended to limit the disclosure of various implementations. In fact, many of these features may be combined in ways not specifically recited in the claims and/or disclosed in the specification. Although each dependent claim listed below may directly depend on only one claim, the disclosure of various implementations includes each dependent claim in combination with every other claim in the claim set. As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiple of the same item.

No element, act, or instruction used herein should be construed as critical or essential unless explicitly described as such. Also, as used herein, the articles "a" and "an" are intended to include one or more items, and may be used interchangeably with "one or more." Further, as used herein, the article "the" is intended to include one or more items referenced in connection with the article "the" and may be used interchangeably with "the one or more." Furthermore, as used herein, the term "set" is intended to include one or more items (e.g., related items, unrelated items, or a combination of related and unrelated items), and may be used interchangeably with "one or more." Where only one item is intended, the phrase "only one" or similar language is used. Also, as used herein, the terms "has," "have," "having," or the like are intended to be open-ended terms. Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

In the preceding specification, various example embodiments have been described with reference to the accompanying drawings. It will, however, be evident that various modifications and changes may be made thereto, and additional embodiments may be implemented, without departing from the broader scope of the invention as set forth in the claims that follow. The specification and drawings are accordingly to be regarded in an illustrative rather than restrictive sense.

What is claimed is:

1. A method, comprising:
   generating, by an originating user equipment, a request to utilize a service that links over-the-top content with a voice call;
   providing, by the originating user equipment, the request to an entitlement server of a core network associated with the originating user equipment;
   receiving, by the originating user equipment and from the entitlement server, information verifying entitlement of the originating user equipment for the service, the information including a tag identifying the service;
   generating, by the originating user equipment and based on receiving the information verifying the entitlement, an invite message with the tag identifying the service;
   providing, by the originating user equipment, the invite message to a terminating user equipment based on the terminating user equipment being verified for the service;
   establishing, by the originating user equipment, the voice call with the terminating user equipment based on providing the invite message and via an Internet protocol multimedia subsystem (IMS) network and the core network; and
   establishing, by the originating user equipment, concurrently with the voice call, a connection for the over-the-top content with the terminating user equipment via a data network and the core network.

2. The method of claim 1, further comprising:
   synchronizing the voice call and the over-the-top content based on the service.

3. The method of claim 2, wherein synchronizing the voice call and the over-the-top content comprises:
   receiving first timestamps and first sequence numbers from first packets associated with the voice call;
   receiving second timestamps and second sequence numbers from second packets associated with the over-the-top content; and
   synchronizing the voice call and the over-the-top content based on the first timestamps, the second timestamps, the first sequence numbers, and the second sequence numbers.

4. The method of claim 1, further comprising:
   establishing, based on the terminating user equipment not being verified for the service, the voice call with the terminating user equipment via the data network and the core network.

5. The method of claim 1, wherein the IMS network provides a threshold quality of service for the voice call established between the originating user equipment and the terminating user equipment.

6. The method of claim 1, wherein the data network provides a best effort bearer connection for the over-the-top content.

7. The method of claim 1, further comprising:
   receiving, from the terminating user equipment, status information identifying an arrival status of packets associated with the voice call and the over-the-top video and generated by the originating user equipment;
   modifying timestamps and sequence numbers for new packets associated with the voice call and the over-the-top content based on the status information; and providing the new packets to the terminating user equipment.

8. An originating user equipment, comprising:
one or more processors configured to:
generate a request to utilize a service that links over-the-top video with a voice call;
provide the request to an entitlement server of a core network associated with the originating user equipment;
receive, from the entitlement server, information verifying entitlement of the originating user equipment for the service,
the information including a tag identifying the service;
generate, based on receiving the information verifying the entitlement, an invite message with the tag identifying the service;
provide the invite message to a terminating user equipment;
establish the voice call with the terminating user equipment based on providing the invite message and via an Internet protocol multimedia subsystem (IMS) network and the core network;
establish, concurrently with the voice call, a connection for the over-the-top content with the terminating user equipment via a data network and the core network; and
synchronize the voice call and the over-the-top content based on the service.

9. The originating user equipment of claim 8, wherein the one or more processors are further configured to:
receive, from the terminating user equipment, status information identifying an arrival status of packets associated with the voice call and the over-the-top content and generated by the originating user equipment;
modify timestamps and sequence numbers for new packets associated with the voice call and the over-the-top content based on the status information; and
provide the new packets to the terminating user equipment.

10. The originating user equipment of claim 8, wherein the service is a voice bridge for the voice call and the tag includes a link to the voice bridge.

11. The originating user equipment of claim 8, wherein the one or more processors, when establishing the voice call with the terminating user equipment, are configured to:
establish the voice call with the terminating user equipment via a real-time transport protocol.

12. The originating user equipment of claim 8, wherein the service is an over-the-top application service and the tag includes a link to the over-the-top application service.

13. The originating user equipment of claim 8, wherein the one or more processors are further configured to:
generate another invite message with the tag;
establish, based on another terminating user equipment being verified for the service, another voice call with the other terminating user equipment via the IMS network and the core network; and
establish, concurrently with the other voice call and via the core network, another over-the-top content with the other terminating user equipment.

14. The originating user equipment of claim 13, wherein the one or more processors are further configured to:
establish, based on the other terminating user equipment not being verified for the service, the other voice call with the other terminating user equipment via the data network and the core network.

15. A non-transitory computer-readable medium storing a set of instructions, the set of instructions comprising:
one or more instructions that, when executed by one or more processors of an originating user equipment, cause the originating user equipment to:
generate a request to utilize a service that links over-the-top content with a voice call;
provide the request to an entitlement server of a core network associated with the originating user equipment;
receive, from the entitlement server, information verifying entitlement of the originating user equipment for the service,
the information including a tag identifying the service;
generate, based on receiving the information verifying the entitlement, an invite message with the tag identifying the service;
provide the invite message to a terminating user equipment;
establish the voice call with the terminating user equipment based on providing the invite message and via an Internet protocol multimedia subsystem (IMS) network and the core network;
establish, concurrently with the voice call, a connection for the over-the-top content with the terminating user equipment via a data network and the core network;
receive, from the terminating user equipment, status information identifying an arrival status of packets associated with the voice call and the over-the-top content and generated by the originating user equipment;
modify timestamps and sequence numbers for new packets associated with the voice call and the over-the-top content based on the status information; and
provide the new packets to the terminating user equipment.

16. The non-transitory computer-readable medium of claim 15, wherein the one or more instructions further cause the originating user equipment to:
synchronize the voice call and the over-the-top content based on the service.

17. The non-transitory computer-readable medium of claim 15, wherein the one or more instructions further cause the originating user equipment to:
establish, based on the terminating user equipment not being verified for the service, the voice call with the terminating user equipment via the data network and the core network.

18. The non-transitory computer-readable medium of claim 15, wherein the one or more instructions, that cause the originating user equipment to establish the voice call with the terminating user equipment, cause the originating user equipment to:
establish the voice call with the terminating user equipment via a real-time transport protocol.

19. The non-transitory computer-readable medium of claim 15, wherein the service is a voice bridge for the voice call and the tag includes a link to the voice bridge.

20. The non-transitory computer-readable medium of claim 15, wherein the one or more instructions further cause the originating user equipment to:
generate another invite message with the tag;
establish, based on another terminating user equipment being verified for the service, another voice call with the other terminating user equipment via the IMS network and the core network; and establish, concurrently with the other voice call and via the core network, another over-the-top content with the other terminating user equipment.

* * * * *